United States Patent [19]

Schemelin et al.

[11] Patent Number: 4,532,755
[45] Date of Patent: Aug. 6, 1985

[54] CLIPPING COLLECTOR FOR RIDING MOWER

[75] Inventors: Michael P. Schemelin, West Bend; Tony L. Kaminski; Paul T. Shupert, both of Milwaukee, all of Wis.

[73] Assignee: Simplicity Manufacturing, Inc., Port Washington, Wis.

[21] Appl. No.: 630,985

[22] Filed: Jul. 16, 1984

[51] Int. Cl.³ .............................................. A01D 35/22
[52] U.S. Cl. ...................................... 56/16.6; 56/202; 56/320.2
[58] Field of Search ..................... 56/320.2, 16.6, 13.6, 56/202, DIG. 22

[56] References Cited

U.S. PATENT DOCUMENTS

| | | | |
|---|---|---|---|
| 3,961,467 | 6/1976 | Carpenter | 56/202 |
| 4,047,368 | 9/1977 | Peterson | 56/320.2 |
| 4,106,272 | 8/1978 | Peterson et al. | 56/16.6 |
| 4,168,600 | 9/1979 | King et al. | 56/202 |

FOREIGN PATENT DOCUMENTS 72572  2/1983  European Pat. Off. ............. 56/202

*Primary Examiner*—Jay N. Eskovitz
*Attorney, Agent, or Firm*—James E. Nilles

[57] ABSTRACT

The disclosed grass catcher cooperates with a rotary mower carried under a riding vehicle and having a clipping outlet from which a duct extends upward and rearward along the side of the vehicle for discharge into upwardly opening bags supported side-by-side at the rear of the vehicle, each carried on an upwardly and rearwardly projecting hook that enables quick and easy removal and remounting of the bags. Clippings issue from the duct in a trajectory that tends to carry them across the width of the vehicle, but they are deflected downward to fill the bags successively. Such deflection is effected by a cover that overlies the bags and the discharge portion of the duct and has a baffle projecting down from its top wall which defines a divergent air channel leading from the duct outlet and under which air blown up through the duct from the mower is diverted in flowing to a screened rear air outlet in the cover. The outlet portion of the duct is readily removably held in place by an elastic band. Without disturbing the duct, the cover can be swung forward from its operative position for easy access to the bags.

14 Claims, 14 Drawing Figures

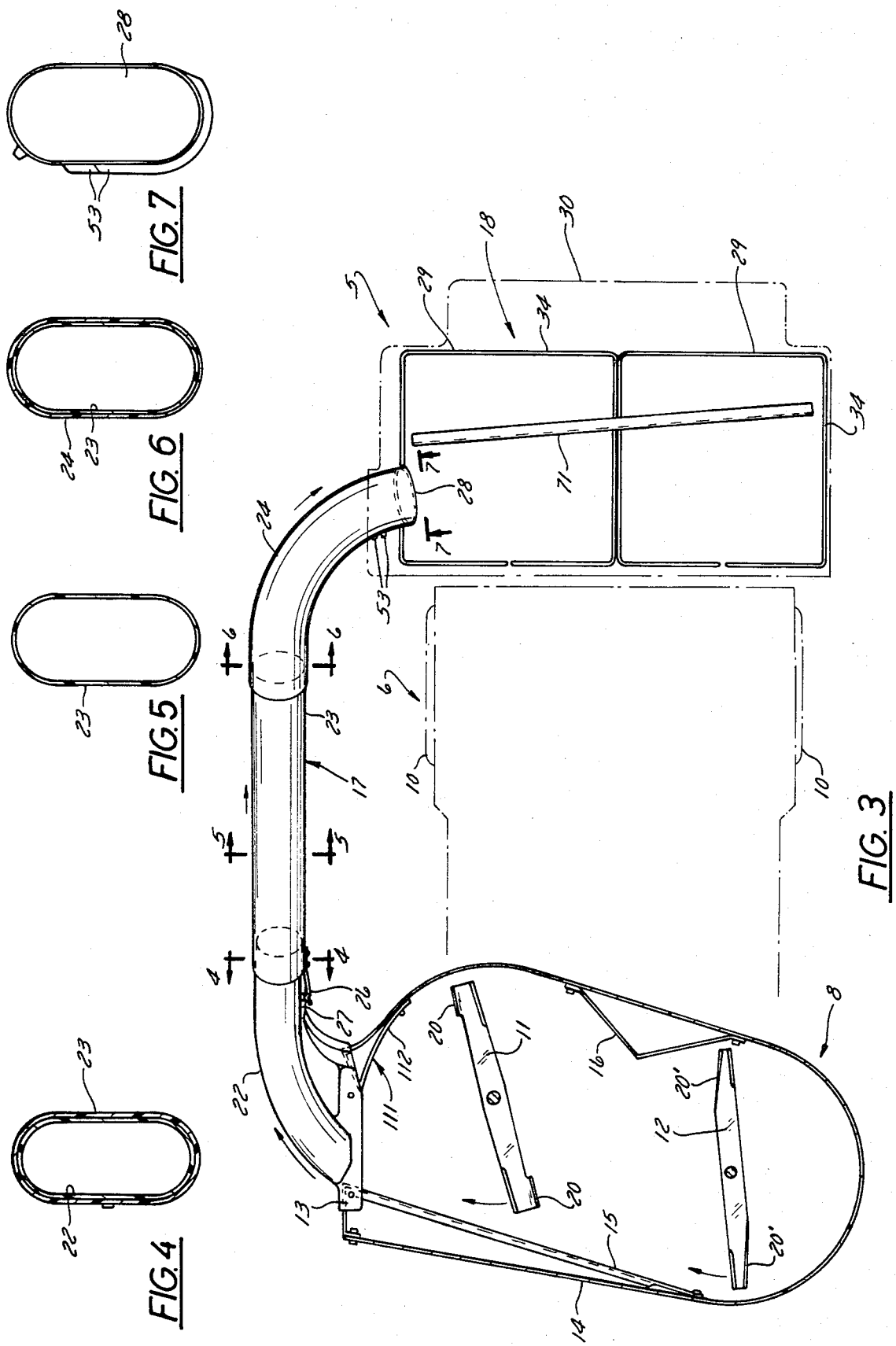

CLIPPING COLLECTOR FOR RIDING MOWER

FIELD OF THE INVENTION

This invention relates to clipping collectors for rotary mowers, and is more particularly concerned with a grass catcher for cooperation with a rotary mower that is mounted beneath a riding vehicle and has a clipping discharge outlet at one side thereof, said grass catcher comprising a duct extending rearward and upward from the mower discharge outlet, upwardly opening clipping receptacles mounted side by side on the rear of the vehicle, and a hood or cover that overlies the clipping receptacles and distributes to them the clippings that issue from the duct.

BACKGROUND OF THE INVENTION

As pointed out in U.S. Pat. No. 4,047,368 to J. F. Peterson, the clipping receptacle of a grass catcher for a riding mower preferably comprises two or more bags mounted side-by-side on the rear of the riding vehicle, each small enough to be easily handled by one person when it is filled, but together providing a substantially large capacity that minimizes the frequency of unloading stops.

The grass catcher structure should provide for quick and easy removal of filled bags and remounting of emptied ones. However, removal of the bags should not involve detachment of small parts that can get lost in deep grass or clippings.

Clippings are guided from the mower discharge outlet towards the clipping receptacle means in a duct which is usually disposed at the side of the riding vehicle to which the mower discharges and which must necessarily have a rearward and upward inclination. Clippings therefore tend to decelerate as they move upward along that duct, so that even in the best designed grass catcher apparatus an occasional plugging of that duct can occur. Fast and easy disassembly of the duct to facilitate its unplugging is thus an important consideration. Of course it is also important for the duct to have stable support, especially at its raised rear end, and such support should be capable of sustaining the constant bumping and vibration to which the apparatus is subjected in use.

It is obviously important for the duct to be so configured that clippings move smoothly and steadily along it, without any tendency to impact against or settle on any part of the duct wall and thus form a nucleus for a growing clump that can soon plug the duct. The duct configuration must therefore take account of the trajectory of clippings discharged from the mower outlet and the dynamics of the airstream that is generated by the mower blade flights and flows along the duct, entraining the clippings and supplementing their own momentum to carry them up through the duct. It has been found that flow of clippings along the duct is not only strongly influenced by the configuration of the inlet portion of the duct but also by that of the mower discharge outlet, which functions, in effect, as the entry to the duct.

At the outlet end of the duct, clippings must be guided into the receptacle means in such a manner that they do not pile up in one part of it while the rest of it remains unfilled. Since clippings have a high angle of repose, there must be provision for a positive distribution of clippings in order to avoid underutilization of the capacity of a large receptacle means.

Prior clipping collectors reflect little or no appreciation of the fact that control of airflow in the zone downstream from the duct outlet not only influences the distribution of clippings in the receptacle means but also has a marked influence upon the flow of clippings along the duct itself. If the airstream is abruptly decelerated upon emergence from the duct outlet, its kinetic energy is converted to a static pressure head against which the flow of air along the duct must be pumped. Thus, if the duct opens abruptly into a wide chamber at its upper end, or if the airstream issuing from the duct is abruptly deflected, airflow along the duct will be correspondingly retarded and the chances for plugging of the duct will be correspondingly increased. Considered from another standpoint, the necessarily high airflow velocity along a duct having an unfavorable outlet geometry can be obtained by pumping more air into the inlet of the duct; but doing so requires more power, so that the mower must have a larger engine with a correspondingly higher fuel consumption. In this respect, it is to be observed that substantially more horsepower is consumed by a rotary mower blade in generating an air draft than in actually cutting through crop.

For guiding clippings away from the duct outlet and distributing them into the receptacle means there is usually a cover or hood that overlies the receptable means and has a connection with the rear end portion of the duct. When in place, this cover tends to interfere with easy removal of the clipping receptacle means; but if the cover is to be displaceable from its operative position, then the security of the operative connection between it and the duct must be taken into account.

The blown air that emerges from the duct must ultimately be discharged from the cover or hood through a screen or the like that prevents clippings from escaping along with the discharged air. Since grass clippings tend to be sticky, especially when they are wet, they tend to adhere to a screen if they can come into contact with it, blocking the outflow of the blown air. Therefore clippings should be guided from the duct to the receptacle means along a path that keeps them away from the screen.

Prior riding mower grass catcher devices have been deficient in that they have failed to satisfy all of the requirements and desiderata set forth above.

U.S. Pat. No. 3,716,977, to Jackson, discloses a grass catcher wherein a single large bag had a subframe around its upper edge whereby it was suspended, and the subframe was slideable horizontally to and from an operative position on a main frame, while the cover remained in its operative position. Such horizontal sliding of the loaded bag on the main frame was awkward at best. A further disadvantage of the arrangement was that removal of the cover for unplugging of the duct involved the detachment of small, easily lost caps that secured the cover in place.

U.S. Pat. No. 4,106,272, to Peterson et al, discloses a rear mounted grass catcher wherein the discharge end portion of the rearwardly and upwardly inclined clipping duct projected into the collecting bag through a hole in its front wall. The hole in the bag was obviously a cause of problems when the bag was removed for emptying, especially if the bag was filled nearly to its top, and it also complicated re-installation of the bag after it had been emptied.

U.S. Pat. No. 3,974,631, to K. H. Rhodes, discloses a grass catcher cover having side and rear walls that were apertured to serve as screens through which blown air could pass, but the cover was also formed in such a manner that clippings tended to contact the apertured walls, and especially the rear wall and one side wall, with the possibility that outflow of air would be severely restricted if the inside surfaces of those walls were not cleaned from time to time.

In the apparatus of the above mentioned U.S. Pat. No. 4,047,368, the clipping receptable bags were held in place by spring clips, and installation and removal of the bags, although not unduly difficult or troublesome, nevertheless left something to be desired in the way of convenience.

In addition to the mechanical inconveniences and disadvantages of prior grass catchers for rotary riding mowers, they were generally unsatisfactory with respect to features that affected the dynamics of clipping flow. In the grass catcher of the above mentioned Rhodes patent, for example, owing to the large area of the apertured walls in the cover, the airstream issuing from the duct practically emerged into the free air and was thus abruptly decelerated, with the results explained above. The notion that the duct should open as nearly as possible to free air is also reflected in the above mentioned Peterson et al patent, wherein there appears a statement that "In order to prevent excessive back pressure in the grass catcher (which would interfere with the movement of the grass and the air through the conduit), the grass catcher is adequately ventilated thereby permitting air to escape freely therefrom." If relatively frequent plugging of the duct was not encountered with such prior grass catchers, it was avoided by employing an engine of substantially higher power than is now known to be necessary. Where power was not expended in driving mower blades with high capacity air lift portions, it was employed to drive a vacuum type pump communicated with the outlet portion of the duct, as disclosed in U.S. Pat. No. 4,095,398 to Aumann et al.

SUMMARY OF THE INVENTION

The general object of this invention is to provide a grass catcher for a rotary mower that is carried at the underside of a riding vehicle and discharges to one side thereof, said grass catcher being mounted on the rear of the vehicle and comprising a plurality of upwardly opening bags that are mounted side-by-side in a manner to be easily removable and to facilitate removal of plastic liner bags that may be inserted into them, and said grass catcher being arranged to fill clippings into said bags sequentially and in such a manner that a full load in the first filled bag does not interfere with filling of the other bag or bags.

Another and very important general object of this invention is to provide grass catcher means comprising clipping receptacle means mounted on the rear of a riding vehicle that carries a rotary mower at its underside, a clipping duct that extends rearwardly and upwardly from a side discharge outlet of the mower, and a hood or cover that overlies the receptacle means and distributes clippings thereto as they issue from the duct outlet, wherein the mower discharge outlet and the cover cooperate with the duct to minimize the power required for carrying clippings through the duct and distributing them to the receptacle means, so that substantially less power is consumed for clipping collection than with prior grass catcher apparatus, and plugging of the duct occurs only rarely.

Another and more specific object of the invention is to provide a grass catcher of the character described wherein the clipping receptacle means comprises a pair of bags that are mounted side-by-side, each removable independently of the other by a slight lifting action, wherein a cover that normally overlies the open tops of the bags to deflect clippings down into them is hinged to be swingable away from its position over the bags, to facilitate their removal and remounting, and wherein the upper end portion of the duct that leads from the mower to the grass catcher is firmly supported irrespective of the position of the cover.

Another specific but very important object of the invention is to provide a grass catcher of the character described, having a clipping duct that extends rearwardly and upwardly from the mower, wherein the upper end of the clipping duct has a secure but readily detachable connection with the support for the grass catcher hood or cover, which connection is so arranged that the cover can be swung up in an instant for access to the clipping collection bags without disturbing the upper end portion of the duct and is further so arranged that the duct can be detached and disassembled in a few seconds for unplugging and can be just as quickly restored to its operative condition.

It is also a specific object of the invention to provide a hood or cover for a grass catcher of the character described, having a screen through which the blown airstream from the mower is discharged, and having a baffle arranged to deflect clippings away from that screen and into grass collecting receptacle means, so that the screen does not become blocked by grass clippings even after prolonged operation without attention to its condition.

Another specific object of the invention is to provide a grass catcher of the character described wherein grass collecting bags are mounted side-by-side and each bag is removable independently of the other or others by simply lifting it through a very small distance and then carrying it away.

BRIEF DESCRIPTION OF DRAWINGS

In the accompanying drawings, which illustrate what is now regarded as a preferred embodiment of the invention:

FIG. 3 is a schematic top plan view of the mower, the cover of the grass catcher and the duct that extends between them;

FIGS. 4, 5, 6 and 7 are cross-section views through the duct, taken, respectively, on the planes of the lines 4—4, 5—5, 6—6 and 7—7 in FIG. 3;

DETAILED DESCRIPTION OF PREFERRED EMBODIMENT OF THE INVENTION

Figure 1:
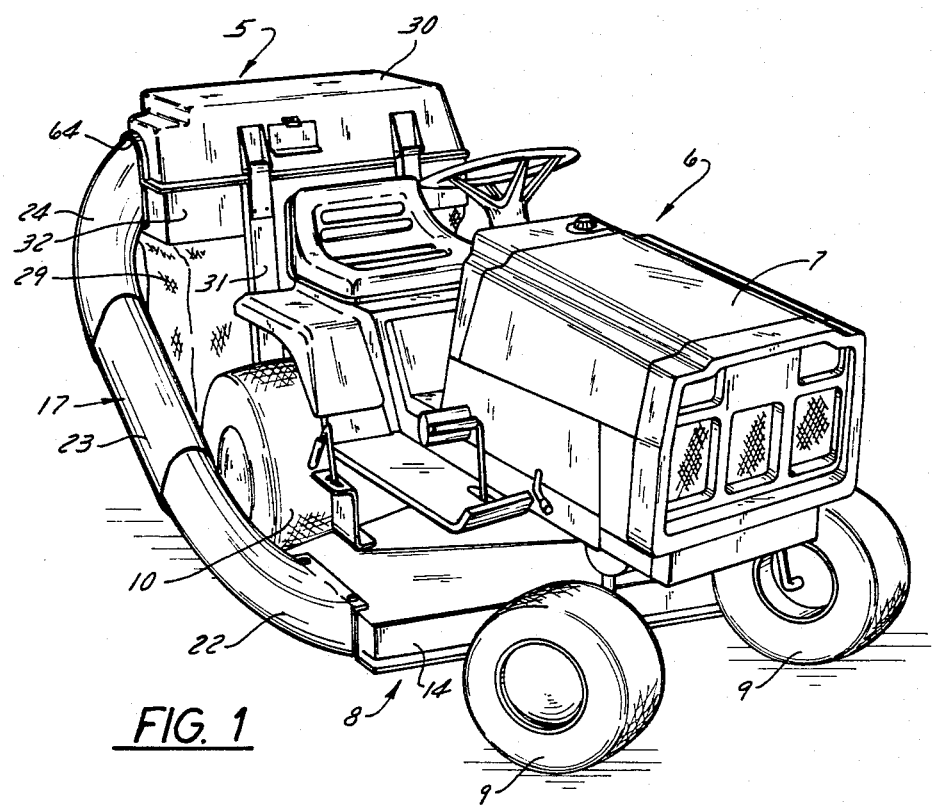
FIG. 1 is a front perspective view of a riding mower equipped with a grass catcher of this invention.

A clipping collector 5 of this invention is intended to be mounted on the rear of a riding mower 6 such as the one here shown, which comprises a small riding tractor 7 that carries a rotary mower 8 at its underside, between its front wheels 9 and its rear wheels 10. In this case the mower 8 has two blades 11 and 12, one blade 11 being an outer blade that is adjacent to a side discharge outlet 13 in the mower housing 14, the other blade 12 being an inner blade that is near the opposite side of the mower housing. The two blades 11 and 12 are driven for rotation in the same direction, which direction is such that the blade tips, in the front portions of their orbits, are moving towards the discharge side of the mower housing. The combined effects of blade impacts, centrifugal force and an airflow generated by the blades cause the clippings to be expelled at a high velocity through the mower discharge opening 13 and into a duct 17 that extends along the discharge side of the tractor vehicle 7. The duct 17 conducts the clippings rearward and upward to the clipping collector 5, where they are deflected laterally and downwardly into receptacle means 18 as hereinafter explained.

As is conventional, the tip portions of the blades are provided at their trailing edges with upwardly inclined lift portions 20. As the blades rotate at high speed, their lift portions 20 generate an updraft whereby the grass beneath them is raised and straightened for cutting to uniform height. The air thus pumped through the blades is discharged through the duct 17 as a fast flowing stream in which the clippings are entrained and which supplements their momentum in carrying them along the duct. The lift portions 20' of the inner blade 12 serve mainly for updraft generation and for producing a lateral flow above that blade which carries clippings into the orbit of the outer blade 11; and therefore, to reduce power required for driving the blades, the lift portions 20' on the inner blade 12 are smaller and can be less steeply inclined than those on the outer blade 11.

The duct 17 comprises a lower inlet section 22 that is secured to the mower housing 14 at the clipping outlet 13, a long, straight, tubular medial section 23, and an upper elbow section 24. All three sections 22, 23, 24 are preferably made of plastic, to have light weight and smooth interior surfaces.

The inlet section 22, as best seen in FIGS. 1, 3, 10 and 13, comprises an elbow that curves rearwardly and has an upward inclination that is uniform along its length.

Figure 14:
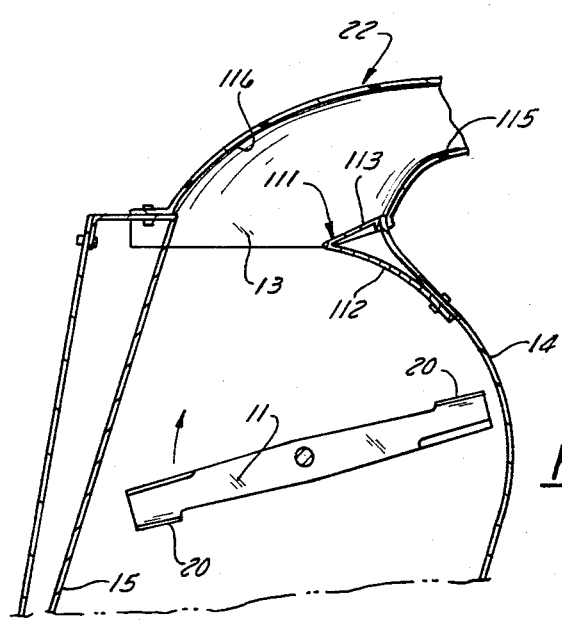
FIG. 14 is a fragmentary view in section through the mower and the front section of the duct, taken on a horizontal plane just below that of the mower blades.
Figure 13:
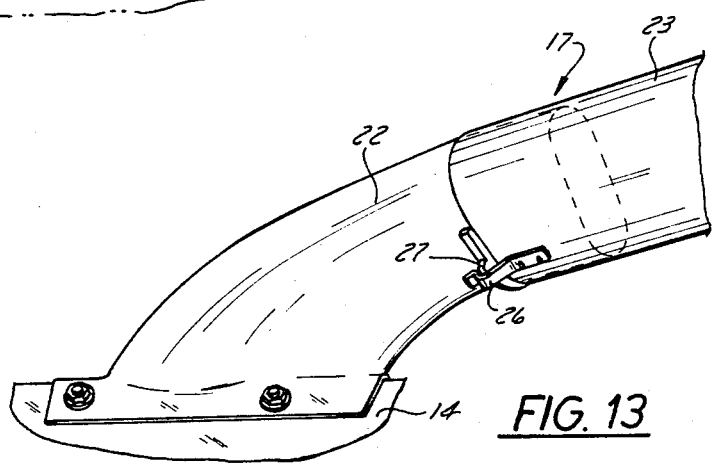
FIG. 13 is a top perspective view of the front end portion of the duct in its connection to the mower.

In general, the geometry of the front portion of the duct inlet section 22 is such that its surfaces extend as nearly as possible parallel to the trajectories of clippings thrown through the mower discharge outlet by the outer blade 11, so that the clippings can slide along those surfaces and be carried in an airstream flowing smoothly along them, rather than being permitted to impact those surfaces. It is important for the attainment of this objective that the effective clipping discharge outlet of the mower be limited to the front outer quadrant of the orbit of the outer mower blade 11, as best seen in FIG. 14. As initially made, the mower housing 14 may have a clipping outlet 13 that extends rearward beyond this front outer quadrant, to provide for a more diffused discharge of clippings when no grass catcher is used; but in that case a more or less V-shaped flow divider baffle 111 is installed at the rear of the clipping outlet, having an inner wall 112 that curves concentrically to the orbit of the tip of the outer blade and having an outer wall 113 that extends at a rearward and outward inclination from the front end of the inner wall 112 to a substantially smoothly merging junction with the radially inner surface 115 of the duct inlet section 22.

The radially outer surface 116 of the duct inlet section 22, at its front end, joins the mower housing at an angle which approximates the trajectory of clippings thrown off each tip of the outer blade when the tip is at the front of its orbit, with the blade in about its position shown in FIG. 14, and that duct surface 116 curves rearwardly to conform to trajectories of clippings thrown off the blade 11 in successive stages of its revolution through something less than 90° from its FIG. 14 position. The outer wall 113 of the flow divider baffle 111 and the radially inner surface 115 of the duct inlet section extend obliquely rearwardly and to the discharge side in a direction matched to the trajectories of clippings that pass near the front end of the flow divider baffle. Clippings discharged in a more rearward trajectory than would allow them to slide along the outer wall 113 of the flow divider baffle are confined against passage into the duct by the inner wall 112 of that baffle and are thus compelled to move around another orbit with the blade 11 while being supported above that blade by the updraft it generates. It will be seen that the flow divider baffle 111 has the effect of preventing a dead spot at the front of the radially inner side of the duct inlet section 22, where clippings could come to rest and accumulate in a buildup across the duct.

From the mower housing clipping outlet 13 the bottom surface of the duct inlet section 22 has a constant upward inclination. In cross-section the duct inlet section transitions smoothly but rather quickly from rectangular and horizontally elongated at its inlet end, where it matches the discharge opening in the mower housing, to an elliptical or race-track shape that has its major axis oriented vertically. Beyond the transition zone the inlet section 22 has this same substantially elliptical cross-section all along its length. Because it has this vertically elongated cross-section through a major part of its turn to the rear, it has a minimum extension to the side of the vehicle 7 for a given turning radius and cross-section area. In addition, the above described geometry of the inlet section 22 encourages clippings to slide around it to its upper surface and slide along that surface, supported by the airflow under them, instead of spiralling around in the inlet section and losing kinetic energy, or dragging along the bottom surface.

The tubular medial section 23 of the duct has a cross-section which is uniform along its length and which is of vertically elongated elliptical or race-track shape to conform to the cross-section of the upper portion of the inlet section 22. The lower or front end portion of the medial section 23 telescopes slidably but snugly over the upper portion of the inlet section 22 and is secured against axial displacement by a spring finger clip 26 that projects lengthwise forwardly beyond it and engages detent-wise over a ridge 27 on the inlet section. The medial section 23 is preferably made of a transparent plastic so that the passage of clippings through it is visible and an operator can observe a slow-down of clipping flow which occurs when the clipping receptacle means 18 is substantially filled.

The curved upper or rear section 24 of the duct, which telescopes over the upper end portion of the medial section 23, has essentially the same elliptical or race-track cross-section as the straight tube 23, and that cross-section is uniform along its length. The upper section 24 curves around through somewhat less than 90°, so that its discharge outlet 28 opens mainly towards the opposite side of the vehicle from the mower discharge, but at a small rearwardly oblique angle; and it has a constant upward inclination all along its length, which inclination is continuous with that of the tubular section 23.

The receptacle means 18 of the clipping collector 5, towards which clippings are conducted by the duct 17, comprises a plurality of bags 29 (two in this case), which are readily removably supported as explained hereinafter. Clippings discharged from the duct outlet 28 are deflected down into the bags 29 by a cover 30 that normally extends across the tops of the bags and over the discharge end portion of the curved upper duct section 24.

As here illustrated, the bags 29 and the cover 30 are supported by structure comprising a pair of upright struts 31 and an elongated, edgewise upright cover support plate 32 that extends lengthwise across substantially the full width of the vehicle 7. The struts 31 have their bottom portions secured to the vehicle frame, and the cover support plate 32 is secured to their upper ends. For rigidity, each of the struts 31 is preferably formed as a U-section channel with rearwardly projecting flanges 31a. Near its upper end each strut 31 has a rearwardly and upwardly projecting hook 33 which is preferably struck out of its web portion and provides for support of a bag 29.

The top edge of each bag is stiffened by a rigid rectangular hoop 34 that is received in a hem 35 around its rim. Each hoop 34 is formed from a single piece of stiff, heavy wire that has its end portions 36 bent to project downward, parallel to one another, at the front of the bag and intermediate its side walls. Overlying the rear of these hoop end portions 36 is a U-shaped hanger 37 that has an upper leg 43 which projects forwardly across the top of the hoop and a lower leg 42 that projects forwardly just below the bottoms of the hoop end portions. The hanger 37 is secured in place by means of a clamping member 38 of substantially W-shaped cross-section that overlies the front of the hoop end portions 36, in cooperation with a bolt (not shown) that connects the hanger 37 and the clamping member 38 and extends between the hoop end portions. The forwardly projecting upper leg 43 of the hanger has a transversely elongated slot 44 in which the bag supporting hook 3 is receivable. Thus each bag 29 can be installed by simply slipping its hanger 37 onto a hook 33 and can be removed by lifting it slightly to disengage its hanger from the hook 33. The width of the legs 42 and 43 of the U-shaped hanger 37 is substantially equal to the distance between the flanges 31a of the struts 31, so that the flanges 31a confine the bag against swinging from side to side; and the lower leg 42 engages the web portion of the strut to cooperate with the weight of the bag in confining it against fore-and-aft swinging.

To support the upper duct section 24, a saddle bracket 45, which can comprise a sheet metal stamping, projects rearward from the cover support plate 32, at the end thereof that is at the discharge side of the machine. This edgewise upright bracket 45 has an arcuate, upwardly concave bay 46 in which the discharge end portion of the upper duct section 24 is cradled. An elastic strap 47 overlies the upper duct section 24 under tension to readily removably secure that duct section to the bracket. The strap 47, which is preferably an endless band of rubber or the like, is connected to an eye hook 49 which is fixed at the front of the bracket 45 and to a detachable hook 50 that engages under a downwardly projecting hook finger 52 formed on the lower rear portion of the bracket. To confine the upper duct section 24 against motion in directions sidewardly relative to the machine, it has spaced parallel ribs 53 that extend partway around it, between which is received the margin of the bracket around its bay 46.

Figure 2:
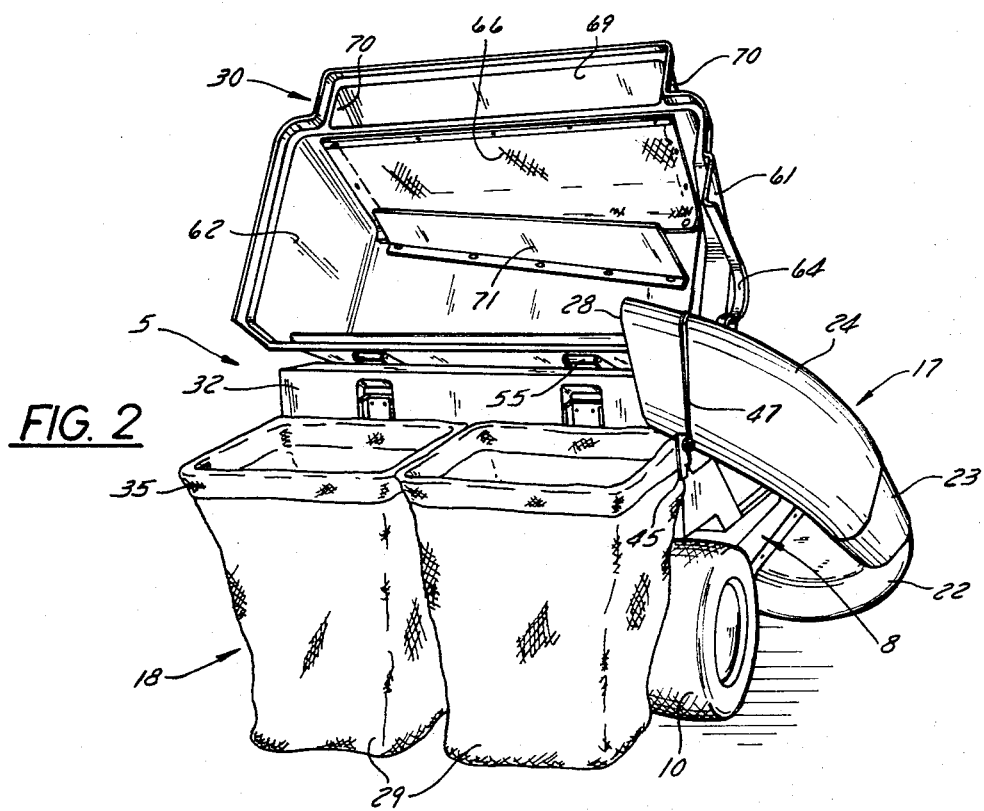
FIG. 2 is a rear perspective view of the riding mower, with the cover of the grass catcher shown in its raised position.
Figure 9:
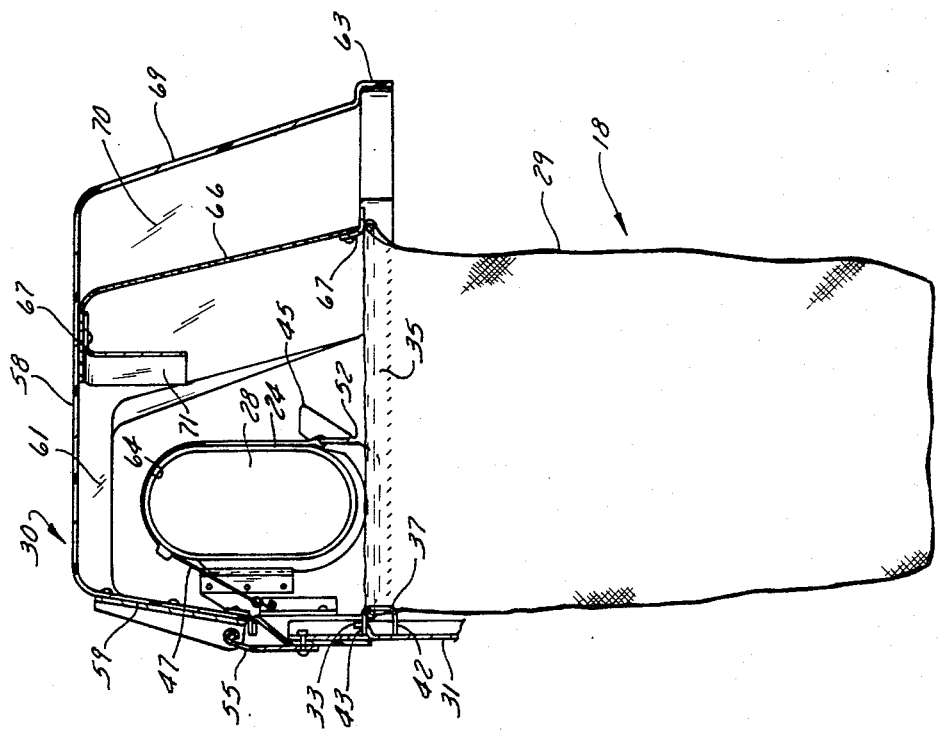
FIG. 9 is a view in vertical section through the grass catcher, taken on the plane of the line 9—9 in FIG. 8.
Figure 8:
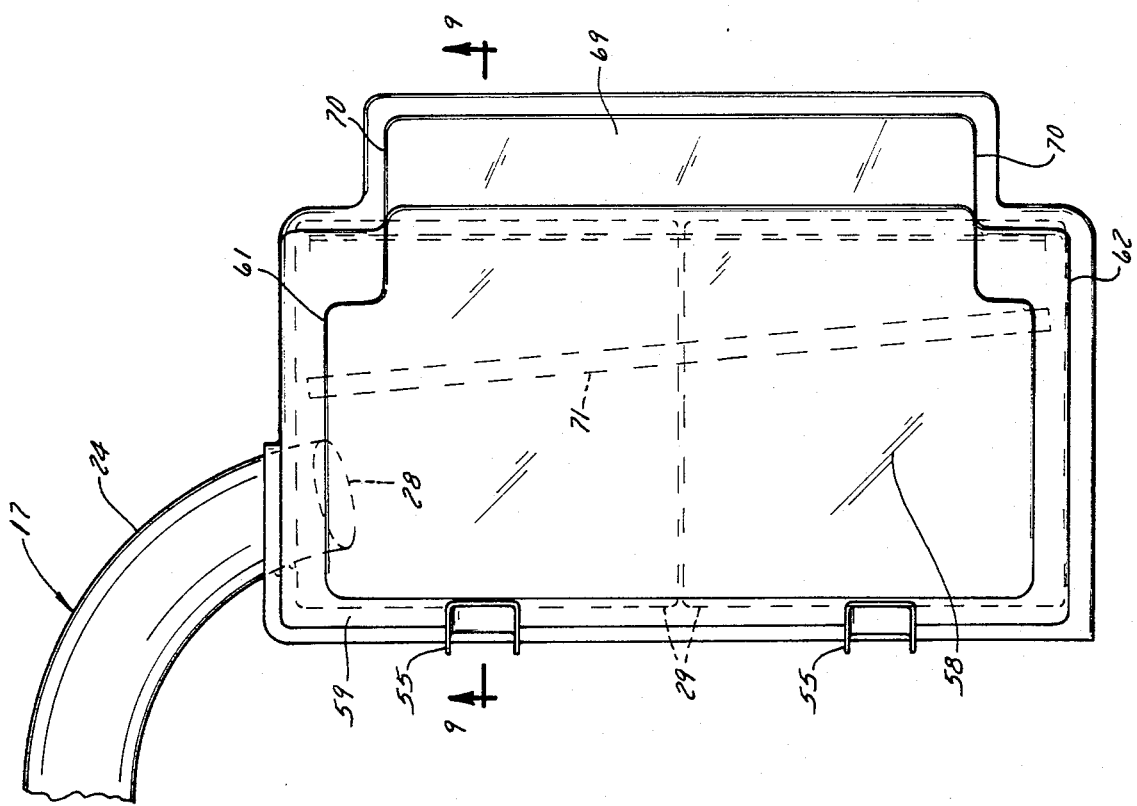
FIG. 8 is a top view of the grass catcher with its cover closed, in relation to the rear portion of the duct.
Figure 10:
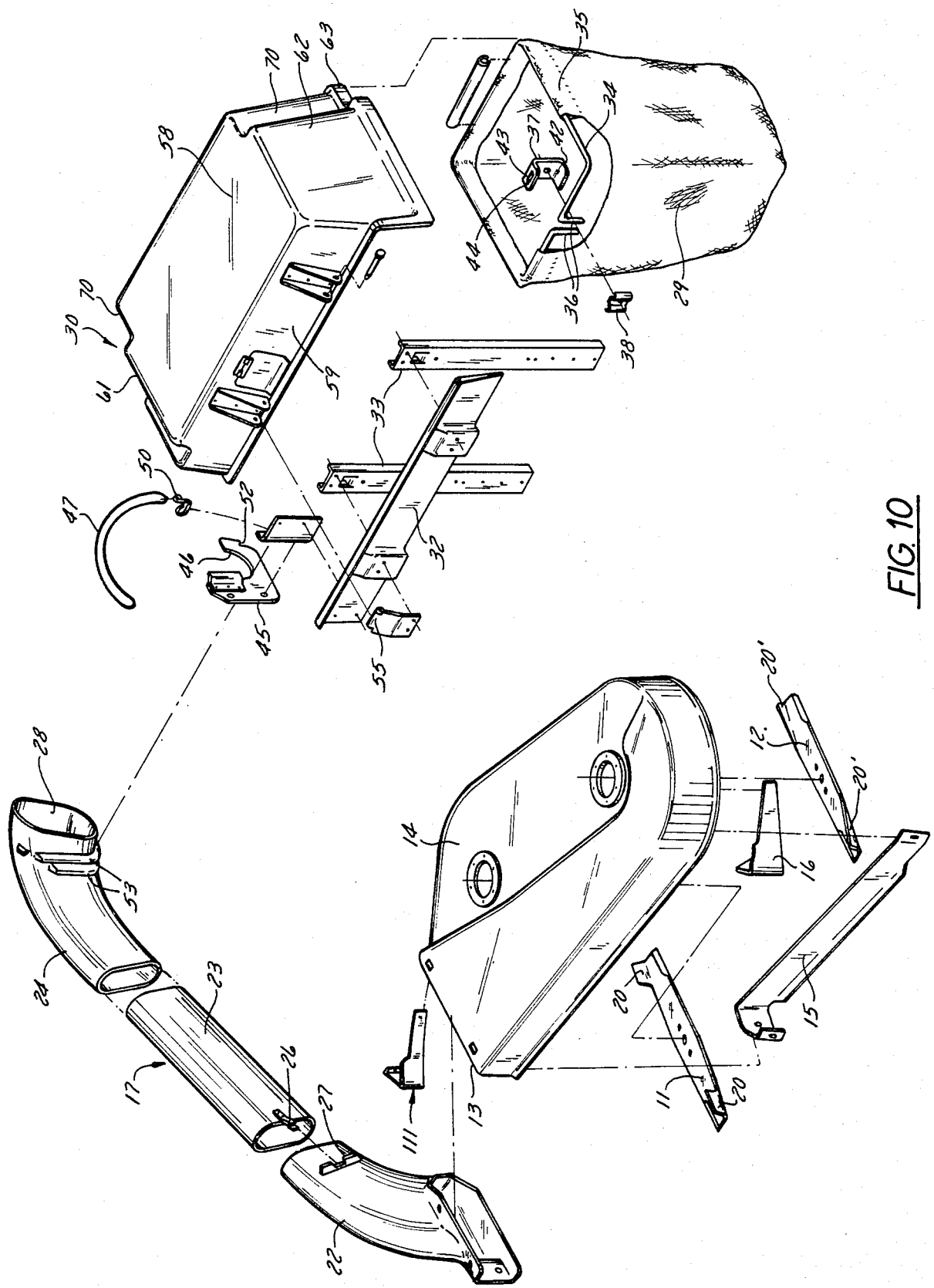
FIG. 10 is an exploded perspective view of the apparatus comprising the mower, the duct and the grass catcher.
Figure 11:
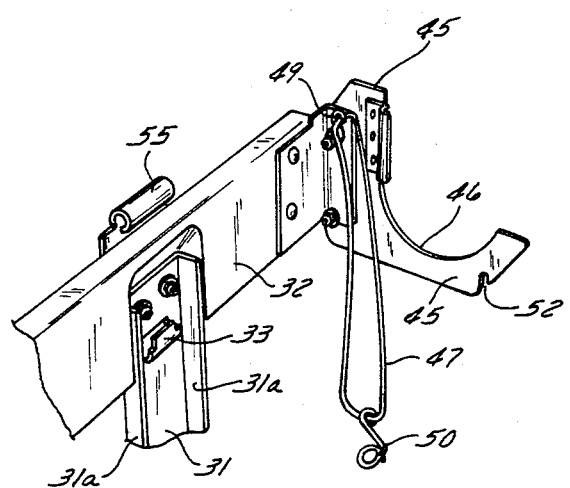
FIG. 11 is a detail perspective view of the cover support plate and the duct supporting bracket.
Figure 12:
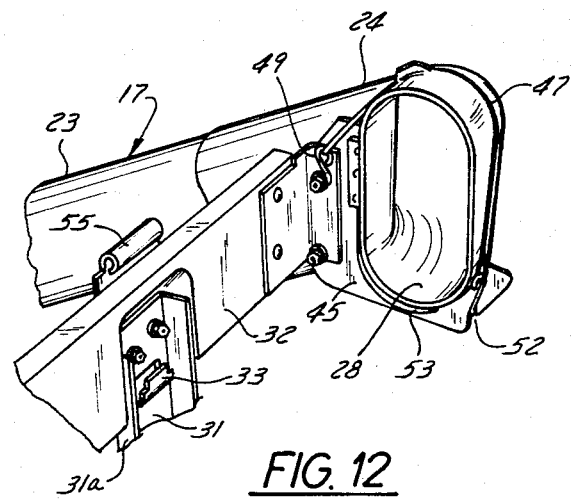
FIG. 12 is a view generally similar to FIG. 11 but showing the discharge portion of the duct secured to the duct supporting bracket.

The cover 30 that deflects clippings down into the bags 29 is hingedly connected to the cover support plate 32, to swing between a closed operative position (shown in FIGS. 1 and 9), in which the cover overlies the bags 29, and a forward open position (shown in FIG. 2) in which the cover is clear of the bags to leave them accessible for removal. As the description proceeds, it will be seen that the weight of the cover causes it to remain in the position to which it is swung. The hinges 55 that connect the cover 30 to the cover support plate 32 have their pivot axes adjacent to the top edge of the cover support plate 32, which is at a level above the tops of the bags. When the cover 30 is in its closed position, its flat top wall 58 is at a level a little above the outlet of the upper duct section 24 (as best seen in FIG. 9) and its front wall 59 is effectively upwardly continuous with the cover support plate 32 and is forwardly adjacent to the duct outlet 28. The opposite substantially vertical side walls 61, 62 of the cover project a distance below the bottom edge of its front wall 59, and their bottom edge portions are formed as ledges 63 that are supported by the hoops 34 that stiffen and support the bags. The side wall 61 at the discharge side of the machine has a downwardly concave arcuate bay 64 therein which is complementary to the bay 46 in the saddle bracket 45 and in which the upper duct section 24 is received.

Projecting down from the top wall 58 of the cover is a screen 66 that is spaced a substantial distance behind the duct outlet 28 and extends across nearly the entire distance between the cover side walls 61, 62. When the cover is closed, a stiffener 67, which extends along the bottom edge of the screen 66 and forms a continuation of the ledges 63 on the cover side walls, rests on the rear portions of the bag hoops 34 to cooperate with the side wall ledges in supporting the cover.

The airstream that is blown up through the duct 17 along with the clippings is discharged through the screen 66, and since the screen has a large area, the airstream issuing from it has a low velocity. Preferably, however, the cover 30 has a deflector portion which comprises a rear wall 69 that is spaced behind the screen and extends down from the top wall 58 of the cover at least to the level of the tops of the bags 29. The deflector further comprises side wall portions 70 which are short in the fore-and-aft direction and which connect the rear wall 69 with the rest of the cover. The airstream passing rearward through the screen 66 is deflected downwardly by the deflector so that dust and pollen which may be carried in that airstream are kept away from the operator.

To distribute clippings into the bags 29 and prevent them from coming into contact with the screen 66, a straight, flat, horizontally elongated baffle 71 projects edgewise down from the top wall 58 of the cover in forwardly spaced relation to the screen. The opposite ends of this baffle 71 are spaced a small distance inward from the respective side walls 61, 62 of the cover, and its horizontal bottom edge, as best seen in FIG. 9, is spaced above the tops of the bags 29 but is well below the level of the top portion of the duct outlet 28. The end of the baffle 71 that is at the discharge side of the machine is spaced a small distance to the rear of the duct outlet, and its opposite end is spaced at a somewhat greater distance to the rear of the front wall 59 of the cover, so that, as best seen in FIG. 9, the baffle extends somewhat obliquely across the cover.

In cooperation with the top wall 58 and front wall 59 of the cover, the baffle 71 defines a diverging flow channel that extends from the duct outlet 28 nearly to the opposite side wall 61 of the cover. In this channel the airstream issuing from the duct outlet 28 is decelerated rather gradually while flowing partly toward the opposite cover side wall 62 and partly under the baffle 71. The airflow in this channel, the constant upward inclination along the length of the upper elbow section 24, and the high speed at which clippings flow through the duct all cause clippings to issue from the duct outlet 28 in a trajectory that tends to carry them across substantially the whole width of the cover and to its side wall 62 that is remote from the duct outlet. However, this trajectory is modified by the baffle 71, inasmuch as the airstream issuing from the duct is deflected downward by it and then flows upward and rearward behind it to escape through the screen 66. Because of this downward air flow induced by the baffle 71, the clippings tend to be drawn downward with the air and then continue to move down into the receptacle means 18 while the air stream turns upward behind the baffle to pass out through the screen. Hence there is no tendency for clippings to settle on the screen 66.

Because of the momentum of the clippings and the velocity of the airstream in the channel defined by the baffle 71, the bag 29 that is remote from the clipping outlet is filled first and it tends to be completely filled before any substantial filling of the other bag begins. The reason for this sequential filling is that when the farther bag is filled to its top, the clippings in that bag cause some choking off of the downward airflow over it and thus bring about a corresponding increase in velocity of the downward airflow over the bag that is nearer the duct outlet 28, with the result that clippings are then deflected into that nearer bag. When the nearer bag is filled to its top, or nearly to its top, there is a substantial throttling of the air flow under the baffle that results in a noticeable slowdown in the rate of flow of clippings through the duct 17, whereby the operator is informed that it is necessary to empty the bags.

From the foregoing description taken with the accompanying drawings it will be apparent that this invention provides a grass catcher for mounting on the rear of a riding vehicle that carries a side discharge rotary mower at its under side, said grass catcher having a plurality of bags mounted side-by-side to serve as clipping receptable means, each of said bags being quickly and easily removable and remountable to minimize the time required for a clipping disposal stop, and said grass catcher being arranged to fill the bags sequentially, to minimize the chances for plugging of the duct that extends from the mower to the grass catcher, and to accomplish clipping collection with a smaller expenditure of power than has heretofore been needed.

What is claimed as the invention is:

1. Grass catcher means for collecting clippings from a rotary mower that is mounted beneath a riding vehicle and has a clipping outlet opening to one side of the vehicle, comprising upwardly opening clipping receptacle means on the rear of the vehicle, extending across substantially the full width of the vehicle, and a duct communicated with said clipping outlet, said duct extending rearward and upward from said clipping outlet along said side of the vehicle and having a rearmost portion that comprises an elbow which defines a duct outlet, said grass catcher means being characterized by:
   A. substantially rigid suporting structure on the vehicle for supporting said clipping receptacle means;
   B. the duct outlet defined by said elbow being supported by said supporting structure at said one side of the vehicle, above the receptacle means, and opening substantially towards the other side of the vehicle; and
   C. a cover hingedly connected with said supporting structure to swing between an operative position overlying said receptacle means and said elbow and and inoperative position clear of the receptacle means, said cover having deflection means thereon for controlling the trajectory of clippings issuing from said duct outlet to constrain them to move downward into the receptacle means, said deflection means comprising
      (1) a top wall on the cover at a level above said duct outlet;
      (2) a side wall at each side of the vehicle projecting down from said top wall to substantially the level of the top of the receptacle means;
      (3) a front wall extending between said side walls, said front wall projecting down from said top wall to near the front upper edge of the receptacle means and being forwardly adjacent to said duct outlet, and
      (4) an elongated baffle projecting edgewise downward from said top wall a distance to have a bottom edge spaced above the top of the receptacle means but below the top of said duct outlet, said baffle having opposite ends inwardly adjacent to said side walls,
         (a) its end at said one side of the vehicle being rearwardly adjacent to said duct outlet, and
         (b) its end at said other side of the vehicle being in rearwardly offset relation to its first mentioned end,
      so that said baffle cooperates with the top and front walls to define a diverging channel that extends from the duct outlet towards said opposite side of the vehicle.

2. The grass catcher of claim 1 wherein said clipping receptacle means comprises a plurality of upwardly opening bags for side-by-side readily detachable support on the rear of the vehicle, further characterized by:
   (1) said supporting structure comprising an upright strut for each said bag,
      (a) each said strut having a substantially U-shaped cross-section with a pair of rearwardly projecting flanges flanking a web that defines a rearwardly facing surface, and (b) each said strut having an upwardly projecting hook for its bag that is offset rearwardly from said web and is disposed between said flanges;

(2) each said bag having (a) a substantially rigid hoop around its top edge and (b) a hanger rigidly secured to said hoop and comprising (i) an apertured leg which projects forwardly beyond the hoop, intermediate the sides of the bag, and which is readily detachably engageable on the hook on the strut for the bag and (ii) a second leg which is spaced below said apertured leg and which has a front end that engages said rearwardly facing surface on the strut to cooperate therewith in supporting said hoop in a substantially horizontal attitude, said second leg having a width to be confined between said flanges and cooperate with them in preventing sideward tilting of the hoop.

3. The grass catcher means of claim 1, further characterized by:

(1) said supporting structure comprising a rearwardly projecting bracket at said one side of the vehicle having an arcuate upwardly concave bay therein in which said elbow is received, (2) an elastic strap having opposite end portions detachably connected to said supporting structure at opposite sides of said bay and which overlies said elbow under tension to confine it in the bay, and (3) said cover having a side wall at said side of the vehicle wherein there is a downwardly concave bay which is complementary to the first mentioned bay and which accommodates the top part of said elbow so that the cover can be swung to its inoperative position without disturbing the connection between the elbow and the supporting structure.

4. Grass catcher means for collecting clippings from a rotary mower that is mounted beneath a riding vehicle and has a clipping outlet opening to one side of the vehicle, comprising upwardly opening clipping receptacle means on the rear of the vehicle, extending across a substantial portion of the width thereof, and a duct communicated with the mower clipping outlet and extending rearward and upward therefrom along said side of the vehicle, said duct having at its upper end an elbow with an outlet portion that is above the clipping receptacle means and projects towards the opposite side of the vehicle, said grass catcher means being characterized by:

A. supporting structure on the vehicle comprising a rearwardly projecting bracket at said one side of the vehicle having an arcuate upwardly concave bay therein in which said outlet portion of the elbow is received;

B. an elastic strap having opposite end portions detachably connected to said supporting structure at opposite sides of said bay and which overlies said outlet portion under tension to confine it in said bay; and C. a cover connected with said supporting structure and normally having an operative position overlying the receptacle means and said outlet portion, said cover having deflection means thereon whereby clippings issuing from said outlet portion in the direction toward said opposite side of the vehicle are deflected downward into the receptacle means.

5. The grass catcher means of claim 4 wherein said cover is hingedly connected with said supporting structure to swing between said operative position and a forward inoperative position away from the receptacle means, and wherein the receptacle means comprises a plurality of bags, further characterized by:

D. each of said bags having (1) a substantially rigid hoop around its top edge, and (2) a hanger rigidly secured to said hoop and comprising an apertured leg which projects forwardly beyond the hoop intermediate the sides of the bag; and E. said supporting structure further comprising an upwardly and rearwardly projecting hook for each bag on which the apertured leg of the hanger for the bag is readily detachably engageable for supporting the bag, said hooks being located to support the bags side-by-side on the rear of the vehicle.

6. The grass catcher means of claim 4 wherein said clipping receptacle means has opposite front and rear wall portions that extend sidewardly relative to the vehicle and has side wall portions near the sides of the vehicle, and wherein said deflection means on the cover comprises:

(1) a top wall on the cover at a level above said outlet portion, (2) a front wall projecting down from said top wall forwardly adjacent to said outlet portion and substantially in upwardly continuous relation with said front wall portion of the clipping receptacle means, and (3) a horizontally elongated baffle projecting downward from said top wall a distance to have a bottom edge spaced above the receptacle means but below the top of said outlet portion, said baffle having one end rearwardly adjacent to said outlet portion and an opposite end which is near said opposite side of the vehicle and is in rearwardly offset relation to its said one end to cooperate with said top and front walls in defining a channel into which said discharge outlet opens and which is divergent towards said opposite side of the vehicle.

7. The grass catcher means of claim 6 wherein said cover is hingedly connected with said supporting structure for swinging between said operative position and an inoperative position in which the cover is spaced from the receptacle means and said outlet portion of the duct, further characterized by:

(1) said cover having opposite side walls projecting down from its top wall, each of which is substantially upwardly continuous with one of said side wall portions of the receptacle means when the cover is in its operative position, and (2) that one of said opposite side walls which is at said one side of the machine having therein a downwardly concave arcuate bay wherein the outlet portion of the elbow is received, so that the cover can be swung between its said positions without interfering with the connection of the elbow to the supporting structure.

8. The grass catcher means of claim 6, further characterized by:

(4) a screen projecting down from said top wall in rearwardly spaced relation to said baffle and substantially in upwardly continuous relation with said rear wall portion of the receptacle means, said screen extending across a substantially major portion of the width of the vehicle and providing an outlet for air which has been blown up through the duct by the mower and which has passed under the baffle.

9. In a grass catcher for collecting clippings from a rotary mower that is mounted beneath a riding vehicle and has a clipping outlet opening to one side of the vehicle, said grass catcher comprising upwardly opening clipping receptacle means on the rear of the vehicle having opposite front and rear wall portions and having one side wall portion near said one side of the vehicle and another side wall portion near the opposite side thereof, and a duct communicated with said clipping outlet that extends rearward and upward therefrom along said side of the vehicle and terminates in an elbow having an outlet portion upwardly adjacent to said one side wall portion of the receptacle means that defines a duct outlet which opens toward said opposite side of the vehicle, a cover normally overlying said outlet portion and the receptacle means and whereby clippings issuing from said duct outlet are constrained to move downward into the receptacle means, said cover being characterized by:

A. a substantially horizontal top wall at a level above said outlet portion, extending across substantially the entire distance between said side wall portions of the receptacle means;

B. a front wall connected with said top wall, said front wall being forwardly adjacent to said duct outlet and extending substantially in upwardly continuous relation to said front wall portion of the receptacle means; and C. a horizontally elongated baffle projecting edgewise downward from said top wall and having a bottom edge spaced above the receptacle means but at a level below the top of said outlet portion, said baffle having
(1) one end which is rearwardly adjacent to said duct outlet and
(2) an opposite end which is near said other side wall portion of the receptacle means and is in rearwardly offset relation to its said one end,
so that said baffle cooperates with the top wall and the front wall to define a channel into which the duct outlet opens and which diverges toward said opposite side of the vehicle.

10. The grass catcher of claim 9 wherein said cover is further characterized by:

D. a screen extending downward from said top wall substantially to the upper edge of said rear wall portion of the receptacle means and extending across most of the distance between said side wall portions of the receptacle means, said screen being spaced behind said baffle and providing for escape of air that has been blown upward through the duct from the mower after such air has been deflected downwardly to flow under the baffle.

11. Apparatus comprising a riding vehicle, a mower carried at the underside of said vehicle and having a housing wherein there is a clipping outlet that opens to one side of the vehicle and a blade that rotates on a vertical axis to have its tip portions move in an orbit adjacent to said outlet and in the direction towards said outlet in the front portion of that orbit, upwardly opening clipping receptacle means on the rear of the vehicle, a duct extending rearward and upwardly along said side of the vehicle from said outlet to above the receptacle means, and a cover that overlies the receptacle means and the rear extremity of the duct for distributing clippings into the receptacle means, said apparatus being characterized by:

A. means on said housing defining a substantially upright wall which
(1) curves substantially concentrically around said axis,
(2) is adjacent to said orbit, and
(3) defines a rear edge of said outlet and extends therefrom around all of that part of said orbit in which the blade tips have components of motion both rearward and away from said side of the vehicle,
so that the trajectories of substantially all clippings passing through said outlet are obliquely rearward and towards said side of the vehicle;

B. the portion of said duct that is adjacent to said outlet
(1) having side surfaces which extend obliquely rearwardly and to said side of the vehicle substantially parallel to said trajectories,
(2) having a bottom surface that extends upwardly and rearwardly at an inclination that is substantially uniform along its length, and
(3) having a cross-section which transitions from substantially rectangular and horizontally elongated at said outlet to substantially elliptical with its major axis vertical; and C. the remainder of said duct
(1) having its bottom surface extending at said rearward and upward inclination all along its length and
(2) having said substantially elliptical cross-section, with its major axis vertical, all along its length.

12. The apparatus of claim 11, further characterized by:

D. said remainder of the duct comprising an elbow section at the rear end portion thereof which curves around towards the opposite side of the vehicle and which defines a duct outlet that
(1) is over the receptacle means, near said one side of the vehicle and near the front of the receptacle means and
(2) opens substantially towards said opposite side of the vehicle; and E. said cover having imperforate portions that define a divergent channel leading from said duct outlet towards the other side of the vehicle, said imperforate portions comprising
(1) a top wall overlying the receptacle means and the portion of said elbow section that is adjacent to said duct outlet,
(2) a front wall extending downward from said top wall across the width of the receptacle means, said front wall being forwardly adjacent to the duct outlet, and
(3) a horizontally elongated baffle projecting down from said top wall, said baffle having
(a) one end rearwardly adjacent to the duct outlet,
(b) an opposite end near said opposite side of the vehicle and in rearwardly offset relation to its said one end, and
(c) a bottom edge which is at a level below that of the upper portion of the duct outlet but above the top of the receptacle means so that an airstream issuing from the duct outlet can escape from said channel by flowing downward and rearward under said baffle.

13. Grass catcher means for collecting clippings from a rotary mower that is mounted beneath a riding vehicle and has a clipping outlet opening to one side of the vehicle, comprising a plurality of upwardly opening bags supported side-by-side on the rear of the vehicle, and a duct communicated with said clipping outlet and extending rearward and upward therefrom along said side of the vehicle, said duct having a rearmost portion comprising an elbow which defines a clipping outlet, said grass catcher means being characterized by:

A. supporting structure on the vehicle comprising an upright strut for each bag,
  (1) each said strut having a substantially U-shaped cross-section with a pair of rearwardly projecting flanges flanking a web that defines a rearwardly facing surface, and
  (2) each said strut having an upwardly projecting hook for its bag that is offset rearwardly from said web and is disposed between said flanges;
B. each said bag having a substantially rigid hoop received in a hem around its top edge and comprising a single piece of wire that has opposite end portions which project downward, parallel to one another, at the front of the bag and intermediate the sides thereof;
C. a substantially U-shaped hanger for each said bag, having
  (1) a substantially flat medial portion that rearwardly overlies said hoop end portions along their lengths,
  (2) an upper leg which projects forwardly from said medial portion across the top of the hoop and in which there is an aperture wherein the hook for the bag is receivable, and
  (3) a lower leg which projects forwardly from said medial portion below the bottoms of the hoop end portions and which engages said surface of the web and is substantially closely receivable between said flanges to confine the hoop against tilting out of a horizontal attitude; and
D. a clamping member for each bag forwardly overlying said hoop end portions between said upper and lower legs and secured to said hanger in clamping relation to said hoop end portions by fastening means extending between said hoop end portions.

14. The grass catcher means of claim 13 wherein the clipping outlet defined by said elbow opens substantially towards the other side of the vehicle, further characterized by:

E. said supporting structure additionally comprising an elongated edgewise upright cover support plate secured to upper portions of its struts and extending lengthwise from side to side of the vehicle;
F. a cover hingedly connected to said cover support plate to swing between an operative position overlying the bags and said elbow and an inoperative position above and forward of the bags that permits the bags to be removed from and installed on the hooks;
G. said supporting structure further comprising a bracket projecting rearward from said cover plate at the end thereof that is adjacent to said one side of the vehicle, said bracket having an arcuate upwardly concave bay therein in which said elbow is received for support by the bracket; and
H. an elastic strap having opposite end portions detachably connected to said supporting structure at opposite sides of said bay and which overlies said elbow under tension to confine it in said bay.

* * * * *